United States Patent [19]
Henderson et al.

[11] Patent Number: 5,549,773
[45] Date of Patent: Aug. 27, 1996

[54] WOVEN PREFORM/MAGNETIC PRESS PROCESS FOR THERMOPLASTIC HONEYCOMB CORES

[75] Inventors: John E. Henderson, Ogden, Utah; John K. Narasaki, Camarillo, Calif.

[73] Assignee: Northrop Grumman Corporation, Los Angeles, Calif.

[21] Appl. No.: 376,266

[22] Filed: Jan. 23, 1995

Related U.S. Application Data

[63] Continuation of Ser. No. 978,102, Nov. 18, 1992, abandoned, which is a continuation of Ser. No. 475,062, Feb. 5, 1990, abandoned.

[51] Int. Cl.$^6$ .............................. B32B 3/12; B32B 31/20
[52] U.S. Cl. .................. 156/173; 156/272.2; 156/272.4; 156/292; 156/380.1; 156/380.6; 428/188; 428/116; 428/118
[58] Field of Search ..................... 156/197, 204, 156/292, 272.2, 272.4, 380.1, 380.6, 215, 173, 205; 428/188, 116, 118; 219/10.53, 10.73

[56] References Cited

U.S. PATENT DOCUMENTS

| | | | |
|---|---|---|---|
| 2,821,616 | 1/1958 | Spott | 428/116 X |
| 3,528,867 | 9/1970 | Leatherman et al. | 156/272.4 |
| 3,617,416 | 11/1971 | Kromrey | 156/173 |
| 3,673,058 | 6/1972 | Jackson et al. | 161/68 |
| 3,795,559 | 3/1974 | Horn et al. | 156/173 X |
| 3,915,776 | 10/1975 | Kaempen | 156/161 |
| 4,090,002 | 5/1978 | Rosenblum | 428/36 |
| 4,541,891 | 9/1985 | Leatherman | 156/379.6 |
| 4,767,484 | 8/1988 | Schott et al. | 156/233 |
| 4,822,660 | 4/1989 | Lipp | 428/113 |
| 4,935,088 | 6/1990 | Mitsuyama | 156/272.4 |
| 4,957,577 | 9/1990 | Huebner | 156/197 |
| 4,961,894 | 10/1990 | Yabe et al. | 264/259 |
| 5,131,970 | 7/1992 | Potter et al. | 156/205 |
| 5,139,596 | 8/1992 | Fell | 156/205 |

FOREIGN PATENT DOCUMENTS 2188866  10/1987  United Kingdom.

*Primary Examiner*—Michele K. Yoder
*Attorney, Agent, or Firm*—Terry J. Anderson; Karl J. Hoch, Jr.

[57] ABSTRACT

Preimpregnated thermoplastic yarn is interwoven around spaced hex mandrels as weft members in a preformed ribbon, which may be folded into layers or cut into sheets for stacking in a honeycomb pattern in preparation for bonding. In block bonding, pressure and heat are applied to an entire fully stacked block to bond the interface facets together and form hex ducts around the mandrels, which must then be extracted, typically individually in a special pneumatic press process. In a preferred layer bonding process certain problems and limitations of block bonding are overcome by bonding each sheet as it is added to a stack buildup. An alternate layer bonding process is disclosed, which is facilitated by magnetic pressing, using electromagnets acting on ferrous mandrels to apply pressure evenly distributed along interfacial facets during thermal fusion bonding. The magnetically pressed layer bonding process is readily automated by disclosed apparatus. Heating and cooling are provided to the mandrels. The sheets used in this method may be either corrugated in a half hex pattern or interwoven with hex passive holding mandrels which may be pushed out and replaced by the machine's aluminum forming mandrels as each sheet is loaded onto the machine.

7 Claims, 3 Drawing Sheets

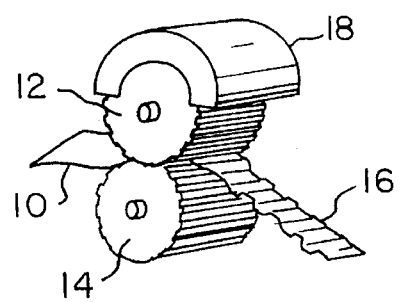
FIG. 1
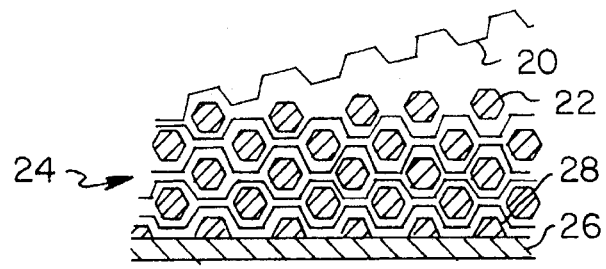
FIG. 2
FIG. 3
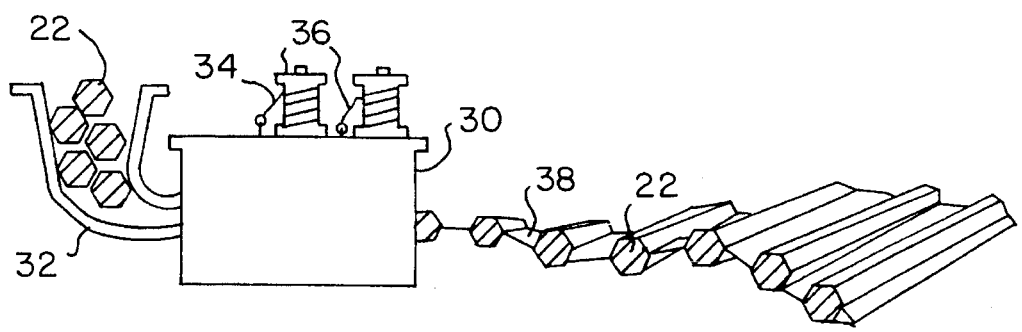
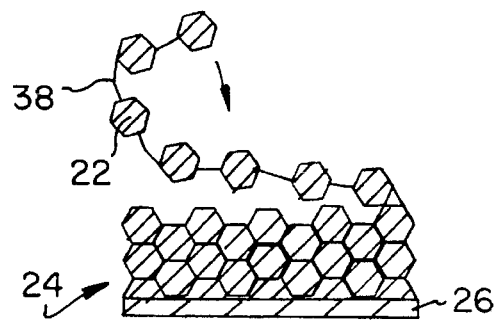
FIG. 4

WOVEN PREFORM/MAGNETIC PRESS PROCESS FOR THERMOPLASTIC HONEYCOMB CORES

CROSS REFERENCE TO RELATED APPLICATIONS

This application is a continuation of commonly-assigned application Ser. No. 07/978,102, filed 18 Nov. 1992, abandoned, which is a continuation of commonly-assigned application Ser. No. 07/475,062, filed 5 Feb. 1990, abandoned.

FIELD OF THE INVENTION

This invention relates to composite structures as used in aircraft, and more particularly to a manufacturing process for processing preimpregnated thermoplastic fiber material into blocks of honeycomb ducted core material capable of sustained service at high temperature.

BACKGROUND OF THE INVENTION

Composite structure in aircraft typically utilize a tough skin surface supported by a lightweight core material. Development efforts to increase the strength/weight ratio of the core have resulted in cellular plastic structures such as rigid expanded foam of random cell pattern. Superior structural properties have been realized in cores formed in a geometric honeycomb pattern of hexagonal ducts, achieving very light weight due to the high percentage of air volume: 90% to 98%. Such a core, when sandwiched between two skins, forms a directional structure possessing a uniform crushing strength under compression.

In known art, such cellular or ducted cores are commonly made from thermosetting resins, which are plastics which solidify when first heated under pressure, and which cannot be remelted or remolded, as opposed to thermoplastic resins, which are materials with linear macromolecular structure that will repeatedly soften when heated and harden when cooled.

As utilization of such structures is expanded to include areas previously avoided due to structural demands and temperature, vibration and impact loading environments, new composite matrices are required. Thermosetting resins, commonly used, in most cases, lack the toughness and stability needed for these applications.

New thermoplastic materials offer improved properties; for example composite skin-surfaced structures having honeycomb cores made from preimpregnated thermoplastic fiber material provide excellent impact strength and damage tolerance. However, by their nature, the new thermoplastic materials require new and unconventional processing methods. As opposed to conventional thermosetting processes where sticky and viscous fluids are saturated into reinforcing fiber forms to be cured by catalysis and heat, thermoplastics which have no cure cycle are hard and "boardy" initially, and have to be melted at high temperatures to be worked to the desired shapes. Thus completely different processing schemes are required for thermoplastics than those that have been developed for thermosets. This also holds true for the honeycomb core which is used to give light composite aircraft parts large moments of inertia to multiply stiffness and strength without proportional increases in weight.

In known art, thermoset honeycomb material is made by a process that takes advantage of the flexibility of the reinforcing fabric before it is impregnated with resin. It is bonded and then expanded into hexagon honeycomb structure while it is soft, then wash coated with resin which is subsequently cured to give it its stiffness.

In contrast, thermoplastics, utilized in the present invention for their superior ultimate properties, have no soft stage, and they are too viscous to be wash coated or by some other means saturated into the fabric after bonding the sheets together. The practical options for bonding thermoplastic core material together are further limited by the difficulty of making good adhesive bonds with thermoplastics. For these reasons, thermal fusion bonding of thermoplastic fiber material into a ducted honeycomb structural pattern has been selected as the method for producing strong lightweight core material in the present invention, which addresses new processing methods for realizing the full benefits of the superior ultimate properties of such structure.

OBJECTS AND SUMMARY OF THE INVENTION

A primary object of this invention is to provide a method of processing pre-impregnated thermoplastic fiber to efficiently produce a ducted core material, preferably in a honeycomb pattern, that can be used at sustained high service temperatures without substantial loss of strength or degradation of mechanical properties.

Further to the primary object it is an object to enable production of blocks of the ducted core material of substantially larger size, well beyond the limitations of known processing art.

Another object is to provide a process yielding a continuous ribbon of thermoplastic fiber fabric with mandrels interwoven as weft members spaced apart so as to be stackable in a honeycomb pattern, by weaving pre-impregnated thermoplastic fiber yarn around the mandrels.

Another object is to provide a layer bonding process enabling sheets of pre-impregnated preformed thermoplastic fibercloth to be thermal fusion bonded one sheet at a time onto a progressively built up stack so as to thus produce a block of ducted core material.

A further object is to implement a layer bonding process with two rows of forming mandrels, which may be secured at one end to a mechanically operable attachment block by which the mandrels may be withdrawn from a stack following a layer bonding cycle, transferred and reinserted mechanically ready for a subsequent layer bonding cycle.

A still further object is to provide means for compressing together and heating each interfacial facet between a most recently added sheet and the previously added sheet in a stack being built up, sufficient for thermal fusion bonding, without transmitting harmful pressure to any unsupported honeycomb ducts.

Layer bonding is effected according to the present invention by the use of a magnetic attractive force applied at uniform intervals along the length of each mandrel in a fork-like row of ferrous forming mandrels to urge the material interfaces uniformly against each other during thermal fusion bonding, optionally supplemented by a cooperating adjacent row of non-ferrous forming mandrels. Such non-ferrous forming mandrels can be used if exact positioning of all ribbon layers is required. Uniform bonding heat is provided by electrical elements within the ferrous mandrels.

This principle of magnetically pressed thermal fusion layer bonding is embodied in accordance with this invention in a machine which provides uniform interface pressure and heat, and mechanized transfer and manipulation of the mandrels and the workpiece to produce honeycomb ducted core material under automatic control.

With regard to layer material preforming, as an alternative to corrugating ribbon material, a preferred embodiment of the present invention provides for weaving preimpregnated thermoplastic fiber yarn into a fabric ribbon with mandrels interwoven as weft members spaced so as to be stackable in a honeycomb pattern in preparation for thermal fusion bonding, thus providing, along with the versatility of being useable for both block bonding processes and magnetic press layer bonding, the advantages of eliminating roll forming and associated heating, labor saving in stacking by prepositioning mandrels, and strengthening the core structure with integrally woven plies.

The manner of making and using the techniques and embodiments of the present invention to meet the above objects and to realize the advantages of the invention will be best understood from a study of the accompanying drawings and the following description thereof.

BRIEF DESCRIPTION OF THE DRAWINGS

FIG. 1 is a schematic representation of a roll-form method of preforming preimpregnated thermoplastic fiber ribbon into a half hex corrugated pattern in preparation for further processing to produce honeycomb core material.

FIG. 2 is a cross-sectional view of a partial stack built up on a press platen from corrugated sheets preformed as in FIG. 1, spaced by hex forming mandrels, in preparation for thermal fusion bonding.

FIG. 3 is a schematic representation of a mandrel-interweave method of preforming a ribbon fabric from preimpregnated thermoplastic fiber yarn material, interwoven with hex mandrels in preparation for further processing to produce honeycomb ducted core blocks in accordance with this invention.

FIG. 4 is a cross-sectional view of a partial stack built up on a press platen from interwoven mandrels as in FIG. 3 in preparation for thermal fusion bonding.

DETAILED DESCRIPTION OF THE INVENTION

Figure 5A:
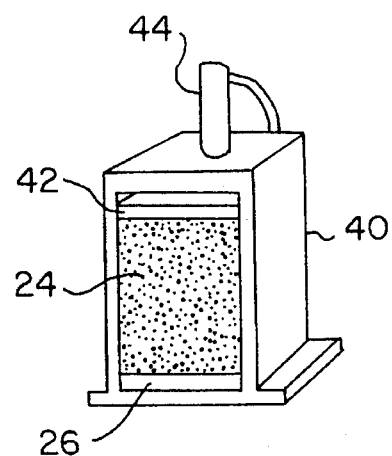
FIGS. 5A–5C is a schematic representation a mechanically-pressed block processing method of thermal fusion bonding blocks of ducted core structure from preimpregnated preformed thermoplastic fiber material.
Figure 5A:
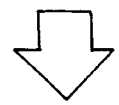

In the cross-sectional representation of FIG. 1, a flat ribbon of preimpregnated thermoplastic fiber 10 is shown being preformed between a pair of spring-pressurized toothed rollers 12 and 14 into a corrugated ribbon 16 in preparation for further processing to produce ducted core material. Heat is applied to the ribbon 10 from roller 12 which is heated by a heating unit 18 wrapped around its upper region. The corrugated ribbon 16 is led from the forming region in a downward inclination so as to cool it from the unheated lower roller 14 as it exits to thus set the material in the corrugated pattern.

FIG. 2 shows corrugated sheets 20, cut to desired workpiece size from the corrugated ribbon (16 in FIG. 1), being stacked together with hex rod mandrels 22 of metal such as aluminum, which are laid side by side into the hex ducts of each sheet as stack 24 is built up layer by layer. The stack is built on a lower press platen 26 which provides conformal support to the bottom preformed sheet by half hex mandrels 28 placed on platen 26 as shown or else by equivalent corrugations machined in the platen 26.

FIG. 3 is a pictorial representation of a novel alternative mandrel-interweave method of preforming the thermoplastic material. A weaving machine 30 receives as input hex mandrels 22, shown in end view loaded into a hopper 32, and preimpregnated thermoplastic fiber yarn 34 supplied on spools 36. A mechanism of known loom technology in machine 30 weaves the yarn 34 around mandrels 22 into a fabric ribbon 38 which carries the mandrels 22 interwoven as weft members in spaced ducts of the fabric as shown.

FIG. 4 shows the fabric ribbon 38 with interwoven mandrels 22 being stacked on press platen 26 which provides conformal bottom support (as described in connection with FIG. 2) in a buildup of stack 24 in preparation for thermal fusion bonding. The ribbon 38 may be added to the stack 24 in continuous form by folding it back at each end as shown, or alternatively it may be cut into sheets of required workpiece size.

Figure 5B:
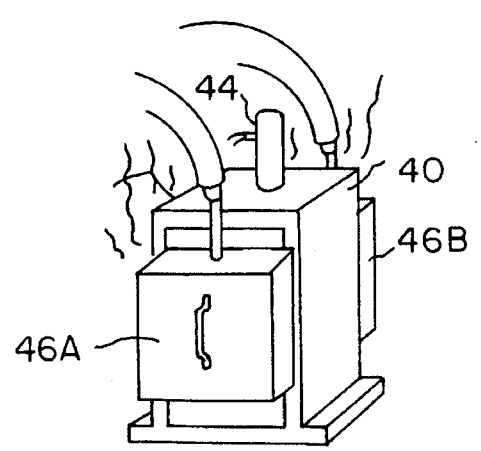
Figure 5B:
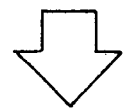
Figure 5C:
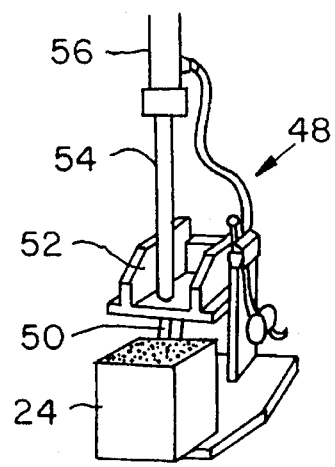

FIGS. 5A–5C shows a basic block bonding process in which a block of material is thermal fusion bonded as a whole in a single bonding cycle.

At step A, a full stack 24 of mandrels and preformed material, which may be corrugated as in FIGS. 1 and 2 or woven as in FIGS. 3 and 4, is built up in a press 40 between lower platen 26 and an upper platen 42, which conformally engages the top preformed sheet of the stack 24 as described for the lower platen 26 (in connection with FIG. 2). Downward pressure is applied to the stack 24 via upper platen 42 from a hydraulic cylinder 44 which may be pressurized by a manual pump and monitored by a pressure gauge.

At step B the press 40 is enclosed by heating units 46A and 46B and, with pressure applied to the stack from cylinder 44 sufficient to hold the sheet material interface facets in contact, hot air is directed onto the stack by jet arrays in heating units 46A and 46B to bring it up to bonding temperature, softening the material and fusion bonding it together at the interfaces while forming ducts around the mandrels. Then after heat is removed and the temperature drops enough for the material to set, pressure is removed.

At step C, the cooled stack 24, removed from the bonding press, must have the mandrels removed. This is not a trivial task since the mandrels tend to be partially bonded despite the previous application of a release agent. A special long stroke pneumatic press 48 is fitted with a long thin drive pin 50, supported by a bracket 52 and a sleeve 54, actuated from pneumatic cylinder 56. Each mandrel is pressed out individually; this operation tends to be difficult and critical, requiring considerable skill and attention to avoid damaging the core duct walls, particularly from the mushroom deformation of the ends of the aluminum mandrels. To prevent buckling, the punch pin 50 may require support from both floating and stationary bushings.

Figure 6:
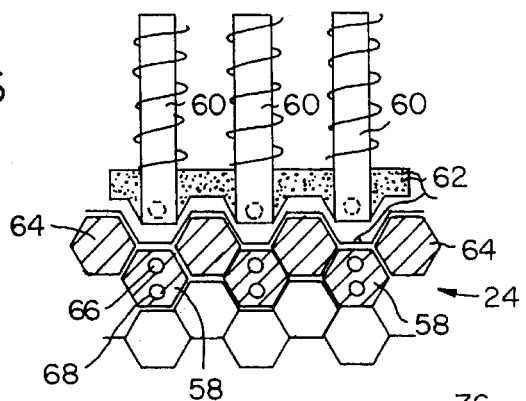
FIG. 6 is a cross-sectional representation of key elements of a magnetically pressed thermal fusion layer bonding process of this invention for producing ducted core blocks of thermoplastic fiber material.

FIG. 6 shows a cross sectional representation of the key elements of a magnetically pressed layer process in which bonding pressure is applied in the form of magnetic attraction between the upward facets of a row of steel (or other ferrous metal) mandrels 58 in the hex ducts beneath the top two preformed sheets of the stack 24 as shown, and corresponding downward poles of electromagnets 60 embedded in a platen 62 configured on its lower side in a half hex corrugated pattern to mate with the preformed sheet at the top of stack 24. An optional interleaved row of aluminum mandrels 64 in the hex ducts of the top preformed sheet act in the normal manner to accurately form the duct during thermal fusion bonding, while having no magnetic effect. Required bonding heat is applied electrically to steel mandrels 58 by embedded 0.060" (1.52 mm) diameter nichrome wire elements 66 embedded near the upper hex facet. A cooling port 68 is also provided in each ferrous mandrel 58 below the heating element 66 to carry cooling fluid. To shorten the cycle time, additional nichrome elements and/or cooling ports may be provided in the platen 62 passing through the lower region of magnets 60, as indicated by dotted circles. Since pressure is applied uniformly along the length of mandrels 58 by equally spacing the magnets 60, and heat is applied uniformly along the length by elements 66, this principle is readily applicable to larger core sizes.

Figure 7:
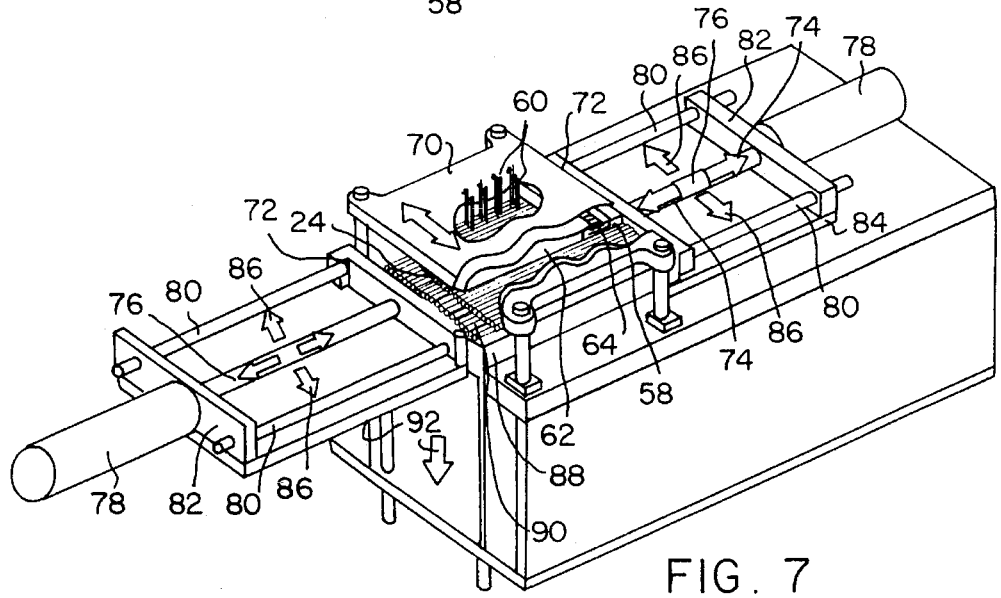
FIG. 7 is a perspective view representing an automatically controllable machine embodying the magnetically pressed layer bonding principles of FIG. 6 for producing ducted core blocks of thermoplastic fiber material in accordance with this invention.
Figure 8:
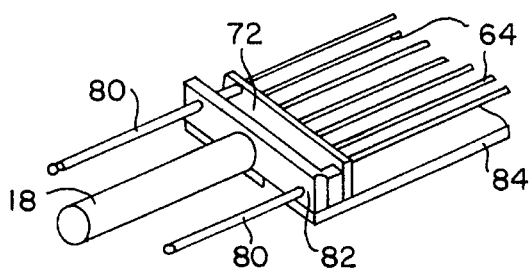
FIG. 8 is a view in perspective of one of the mandrel retraction subassemblies of the apparatus shown in FIG. 7.

The perspective view in FIG. 7 represents a proposed manufacturing apparatus utilizing the magnetic press principle of FIG. 6. The workpiece, stack 24, is shown in an initial phase of buildup with only a few preformed sheets in place. An overhead plate 70 supports platen 62 in a short transverse track. Platen 62 carries a full array of magnets 60, of which a representative group is shown through the broken away portion of the drawing.

The mandrels 58 and 64 are tapered and rounded at their free end so as to guide their entry into the ducts of stack 24, and they are secured at the other end to an attachment block 72 which is movable longitudinally, as indicated by arrows 74, by plunger 76 of actuator 78, with sufficient travel to withdraw the mandrels 58 and 64 from the stack 24, the movement being guided by rods 80 passing through guide block 82, affixed to carriage 84 which is movable laterally as indicated by arrows 86, under control of an automated transfer system. The range of this lateral movement, which is also applied to platen 62, is only a small amount equal to the offset between adjacent ducts in the honeycomb core.

The lower platen 88, provided with a half hex groove pattern 90 on its upper side mating with the bottom preformed sheet in stack 24, may be raised or lowered as indicated by arrows 92 by a mechanism also under control of the automated transfer system.

The machine functions by placing a first preformed sheet onto the steel mandrels 58 and then placing a second preformed sheet node-aligned on the first sheet and onto the aluminum mandrels 64. The lower platen 88 is elevated to lightly engage and support the first sheet. The upper platen 62 located (as shown in FIG. 6, with the magnets 60 over the steel mandrels 58), and current is applied to the magnets 60, attracting the steel mandrels 58 so as to apply the required bonding pressure to the interface regions. The mandrels are then heated by the nichrome wire until bonding temperature is reached, then heating power is removed and mandrels 58 are cooled by pumping coolant through the cooling ports. The mandrels 58 and 64 are then withdrawn, lower platen 90 is lowered a half hex height, carriage 84 is shifted transversely to an alternate position which aligns the steel mandrels 58 with the ducts in the second (top) layer, platen 62 is shifted laterally equal to the offset between adjacent ducts, then actuator 78 inserts the steel mandrels 58, and a third preformed sheet is loaded on top of the second and onto the aluminum mandrels 64, and another bonding cycle is performed as before. The operational cycle is repeated until the required stack height has been built up in stack 24. Then, with the mandrels 58 and 64 retracted, the finished stack is removed toward the left in FIG. 7, ready to be cut to size for use as a core in composite structure.

This method of extracting the mandrels 58 and 64 eliminates the high labor burden and the risk of mandrel end deformation and related core damage inherent in the press punch method of FIG. 5 step C. In the method of FIG. 7, pulling the mandrels out under tension facilitates production of cores of greatly increased thickness.

For illustrative purposes, the process described above in connection with FIG. 7 assumes the use of preformed sheets configured with half-hex corrugations as shown in FIG. 2. Alternatively, preformed material interwoven with mandrels as described in connection with FIG. 4 may be utilized. The woven ribbon 38 is cut into sheets of required length including interwoven mandrels 22, and then layer bonded during stacking in a manner similar to that described for corrugated material in connection with FIG. 7, except that as a new sheet is loaded onto mandrels 58, the interwoven mandrels 22 are pushed out of the stack and retrieved.

The particular hex duct honeycomb pattern shown herein should not be considered as restrictive; the processes of this invention are generally applicable to ducted cores of various matrix patterns of which the honeycomb is representative.

The invention may be embodied in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A method of producing a honeycomb ducted core structure from preimpregnated thermoplastic fiber yarn, comprising the steps of:

weaving said yarn into a fabric ribbon having hexagonal mandrels interwoven as weft members, said hexagonal members being spaced apart at equal intervals, said fabric ribbon defining hexagonal cells around each of said interwoven hexagonal mandrels, each said interval being equal to a facet width of said hexagonal cells, each region of said fabric ribbon extending between adjacent ones of said hexagonal cells defining a web of said fabric ribbon;

cutting said fabric ribbon into a plurality of sheets, each of said sheets having a row of said hexagonal cells;

replacing each said hexagonal mandrel of a first one of said sheets with a respective hexagonal ferromagnetic heating/cooling mandrel;

positioning a second one of said sheets upon said first sheet in a honeycomb pattern, at least one of said hexagonal cells of said second sheet nesting between adjacent ones of said hexagonal cells of said first sheet, at least one of said webs of said second sheet interfacing a facet of a respective hexagonal cell of said first sheet;

replacing each said hexagonal mandrel of said second sheet with a respective hexagonal non-ferromagnetic mandrel;

locating an electromagnet opposite each said hexagonal ferromagnetic heating/cooling mandrel proximate a side of said interfacing web of said second sheet opposite from said interfacing facet of said first sheet;

activating each said electromagnet, whereby each said opposite hexagonal ferromagnetic heating/cooling mandrel is attracted to said opposite electromagnet by magnetic force, whereby fusion bonding pressure is applied to said interfacing webs and facets;

heating each said hexagonal ferromagnetic heating/cooling mandrel while said fusion bonding pressure is applied, whereby said interfacing webs and facets are fusion bonded together;

cooling each said hexagonal ferromagnetic heating/cooling mandrel, whereby said fusion bonded interfacing webs and facets are set;

deactivating each said electromagnet, whereby fusion bonding pressure is removed from said fusion bonded interfacing webs and facets and whereby a layer of said honeycomb ducted core structure is formed;

replacing each said hexagonal non-ferromagnetic mandrel with a respective hexagonal ferromagnetic heating/cooling mandrel;

positioning an additional one of said sheets upon said fusion bonded webs and facets, each web of said additional sheet interfacing with a respective facet of a cell of a preceding one of said sheets last fusion bonded to form a preceding layer of said honeycomb ducted core structure;

replacing each said hexagonal mandrel of said additional sheet with a respective hexagonal non-ferromagnetic mandrel; and, repeating said locating, activating, heating, cooling, deactivating, second replacing, second positioning, and third replacing steps to form additional layers of said honeycomb ducted core structure until said honeycomb ducted core structure is produced to a required number of layers.

2. The method of forming a honeycomb structure from stacked fiber reinforced thermoplastic strips bonded together by thermoplastic fusion, said structure characterized by a plurality of stacked layers of hexagonal honeycomb cells each layer being offset from the adjacent layer, comprising providing a plurality of thermoplastic strips, providing a plurality of ferromagnetic mandrels of hexagonal shape in cross section, each mandrel including means for heating the same to a temperature above the fusion temperature of said thermoplastic strips and further including means for cooling the mandrel to below the fusion temperature, preforming each of said strips into a repeating hexagonal pattern defining a row of half hexagonal cells in which each hexagonal cell is separated by a facet of a hexagonal cell, placing a first preformed strip to form a first layer in said structure with one of said mandrels in each of said cells below said first strip, said mandrels being in contact with and supporting the top facet of each said cell, placing the next preformed strip on the first strip so that the lower facets of said next strip are juxtaposed to and overlie the top, mandrel supported facets of the first strip, providing and supporting at least one electromagnet into contact with at least one of that row of facets of said next strip immediately adjacent at least one mandrel so that the adjacent facets of said strip are interposed between the mandrel and the electromagnet, heating at least said one mandrel to above the fusion temperature of said interposed thermoplastic strips, said facets being heated by conduction therefrom, energizing said electromagnet to strongly attract said mandrel and to mechanically compress the interposed facets of the first and next strips together while heated to thereby fusion bond them together, cooling said one mandrel through said cooling means, repeating the above steps for each of the juxtaposed facets of said row to form a new row of open hexagonal cells, removing the mandrels and inserting them into the new row of open cells just formed, repeating the foregoing steps with further thermoplastic strips to build a bonded honeycomb structure one layer at a time until finished.

3. The method of claim 2 further in which the step of providing said electromagnet includes providing a plurality of electromagnets along at least one row to make contact therealong in a plurality of locations, and simultaneously energizing said electromagnets while heating said mandrel.

4. The method of claim 2 further in which the step of providing said electromagnet includes providing a plurality of electromagnets along a plurality of rows to make contact therealong in a plurality of locations along each of said rows, and simultaneously energizing said electromagnets while heating said mandrels.

5. The method of forming a honeycomb structure from stacked fiber reinforced thermoplastic strips bonded together by thermoplastic fusion, said structure characterized by a plurality of stacked layers of hexagonal honeycomb cells each layer being offset from the adjacent layer, comprising providing a quantity of thermoplastic yarn, providing a plurality of ferromagnetic mandrels of hexagonal shape in cross section, each mandrel including means for heating the same to a temperature above the fusion temperature of said thermoplastic yarn and further including means for cooling the mandrel to below the fusion temperature, weaving said yarn into woven strips formed about said mandrels as a repeating hexagonal pattern of hexagonal cells having a mandrel in each cell, and in which each cell is separated by a strip section of one hexagonal facet width, supporting a first preformed strip to form a first layer in said honeycomb structure each of said mandrels being in contact with and supporting the top facet of each of the cells of said first strip respectively to start a row of open hexagonal cells, placing the next preformed strip on the first strip so that the lower facets of said next strip are juxtaposed to and overlie the top, mandrel supported facets of the first strip, providing and supporting at least one electromagnet in contact with a facet of said next strip immediately adjacent the mandrels, the adjacent facets of said strips being interposed between the mandrel and the electromagnet, heating said mandrel to above the fusion temperature of said thermoplastic strips, said facets being so heated by conduction, energizing said electromagnet to strongly attract said mandrels and to mechanically compress the interposed facets of the first and next strips together while heated to thereby fusion bond them together, cooling the mandrels through said cooling means, repeating the above steps for each of the juxtaposed facets of said row to form a new row of open hexagonal cells, and repeating the foregoing steps with further thermoplastic strips to build a bonded honeycomb structure one layer at a time until finished.

6. The method of claim 5 further in which the step of providing said electromagnet includes providing a plurality of electromagnets along at least one row to make contact therealong in a plurality of locations, and simultaneously energizing said electromagnets while heating said mandrel.

7. The method of claim 5 further in which the step of providing said electromagnet includes providing a plurality of electromagnets along a plurality of rows to make contact therealong in a plurality of locations along each of said rows, and simultaneously energizing said electromagnets while heating said mandrels.

* * * * *